(12) United States Patent
Cheng et al.

(10) Patent No.: US 7,853,882 B2
(45) Date of Patent: Dec. 14, 2010

(54) PORTLETS HAVING DIFFERENT PORTLET SPECIFIC ENABLEMENT STATES

(75) Inventors: Tsz S. Cheng, Grand Prairie, TX (US); Gregory P. Fitzpatrick, Keller, TX (US); Daniel Hassell, Flower Mound, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 11/402,567

(22) Filed: Apr. 11, 2006

(65) Prior Publication Data

US 2007/0240063 A1    Oct. 11, 2007

(51) Int. Cl.
*G06F 3/00* (2006.01)

(52) U.S. Cl. ............................. 715/741; 715/743

(58) Field of Classification Search .................. 715/741, 715/743
See application file for complete search history.

(56) References Cited

U.S. PATENT DOCUMENTS

| | | | |
|---|---|---|---|
| 5,960,080 A * | 9/1999 | Fahlman et al. | 380/252 |
| 6,327,628 B1 * | 12/2001 | Anuff et al. | 719/311 |
| 6,871,197 B1 * | 3/2005 | Johnson | 706/61 |
| 7,222,369 B2 * | 5/2007 | Vering et al. | 726/28 |
| 7,313,825 B2 * | 12/2007 | Redlich et al. | 726/27 |
| 7,548,957 B1 * | 6/2009 | Wichmann et al. | 709/217 |
| 7,707,514 B2 * | 4/2010 | Forstall et al. | 715/810 |
| 2002/0005867 A1 * | 1/2002 | Gvily | 345/760 |
| 2002/0067370 A1 * | 6/2002 | Forney et al. | 345/742 |
| 2002/0111962 A1 * | 8/2002 | Crucs | 707/505 |
| 2002/0158899 A1 * | 10/2002 | Raymond | 345/736 |
| 2003/0149781 A1 | 8/2003 | Yared et al. | |
| 2004/0260622 A1 | 12/2004 | Chan et al. | |
| 2005/0021765 A1 * | 1/2005 | Flores et al. | 709/228 |
| 2005/0114701 A1 | 5/2005 | Atkins et al. | |
| 2005/0132023 A1 | 6/2005 | Cazzolla et al. | |
| 2005/0140572 A1 * | 6/2005 | Kahan et al. | 345/7 |
| 2005/0223412 A1 | 10/2005 | Nadalin et al. | |
| 2005/0262219 A1 | 11/2005 | Allamaraju et al. | |
| 2006/0010390 A1 * | 1/2006 | Guido et al. | 715/742 |
| 2006/0070002 A1 | 3/2006 | Guido et al. | |
| 2006/0075348 A1 * | 4/2006 | Xu et al. | 715/730 |
| 2007/0130518 A1 * | 6/2007 | Shavit et al. | 715/530 |

\* cited by examiner

*Primary Examiner*—Joshua D Campbell
*Assistant Examiner*—Stephen Alvesteffer
(74) *Attorney, Agent, or Firm*—Patents On Demand, PA; Brian K. Buchheit

(57) ABSTRACT

A method for selectively securing portlets can include a step of providing a portal that includes multiple portlets. A portlet enablement event associated with a set of at least one of the portlets can be determined. The set include a number of portlets less than a total number of portlets in the portal. Responsive to the portlet enablement event, portlet enablement states can be changed for each portlet in the set without changing portlet enablement states of portlets not included in the set. Different portlet enablement states can include enabled, disabled, and access restricted states.

17 Claims, 4 Drawing Sheets

PORTLETS HAVING DIFFERENT PORTLET SPECIFIC ENABLEMENT STATES

BACKGROUND

1. Field of the Invention

The present invention relates to the field of Web portals, and, more particularly, portlets of a Web portal having different portlet specific enablement states.

2. Description of the Related Art

A Web portal is a Web site or service that offers a broad array of resources and information, such as e-mail, search engines, advertising, user-specific reports, personalized contact and task management functions, customized news feeds, local weather, and the like. A Web portal can include multiple Web portlets. Each Web portlet can be a reusable Web component that displays information to portal users from a designated source, which can be different from the source that provides information for the portal.

Portlet specifications can enable interoperability between Web portlets and Web portals. That is, portlet specifications can define a set of Application Program Interfaces (APIs) for portal to portlet communications in areas of aggregation, personalization, presentation, and security. For example, Web Services for Remote Portlets (WSRP) is a standard to access and display portlets that are hosted on a remote server.

Many Web portals include one or more portlet that contains customized information, which may include confidential data. A user typically provides identification and authorization information upon accessing the portal that authenticates a user to access all portal information. Hence, conventional portals are based upon an all-or-nothing model, where a security check is performed for all the portlets by providing a one time password for the portal. The all-or-nothing access model is sufficient as long as a portal user is comfortable with the idea of accessing all areas of the portal using the similar security parameters, even though each portlet can display information having different sensitivity or security levels.

Situations exist where an all-or-nothing model is less than optimal. For example, a user accessing a portal from a public place may wish to review email messages and/or news stories, each of which has a moderately low sensitively level. Another portlet of the portal, however, can contain extremely sensitive information, such as credit card numbers with credit limits and/or bank account numbers with balances. To access the desired information via the portal, the user must risk a possibility of bystanders viewing and abusing the sensitive information. The user can minimize the risk by quickly logging off the portal as soon as possible, which can be inconvenient to the user that desires to spend more time accessing the less sensitive information from one portal. Therefore, conventional technologies require a portal user to comprise between information access and security considerations based upon an all-or-nothing model.

SUMMARY OF THE INVENTION

A Web portal solution having portlets with independent enablement states in accordance with an embodiment of the inventive arrangements disclosed herein. Each portlet of the portal can be selectively enabled, disabled, or enabled in an access restricted fashion. A disabled portlet can be one that has a communication connection severed with a data source or can be a portlet that is visually obscured by a graphical overlay, such as a portlet specific screen saver. A disabled portlet can require a user re-login to the portlet before the portlet is re-enabled.

A partially disabled portlet can be one with an applied data sensitivity filter so that only data at certain sensitivity level is displayed, such as displaying unclassified information but not displaying secret information. Another type of access restricted portlet can include a portlet that has one mode of interaction blocked, while another open. For example, a visual modality for a portlet can be blocked, while an audio modality can be enabled. In this manner, a user can hear sensitive information (possibly while wearing headphones) that is not visually presented, and is therefore not subject to being visually gleaned by bystanders.

The present invention can be implemented in accordance with numerous aspects consistent with material presented herein. For example, one aspect of the present invention can include a method for selectively enabling portlets. The method can include a step of providing a portal that includes multiple portlets. A portlet enablement event associated with a set of at least one of the portlets can be determined. The set can include a number of portlets less than a total number of portlets in the portal. Responsive to the portlet enablement event, portlet enablement states can be changed for each portlet in the set without changing portlet enablement states of portlets not included in the set. Different portlet enablement states can include enabled, disabled, and access restricted states.

Another aspect of the present invention can include a software interface including a Web portal containing multiple portal segments. Each portal segment can be associated with a segment specific enablement state. Enablement states for each of the portal segments include an enabled state and a disabled state. The interface can also include multiple user selectable controls for manually changing the enablement state of each of the portal segments. In one embodiment, at least a portion of the portal segments can include a portlet.

Still another aspect of the present invention can include a system for displaying Web content, which includes a portal server and a Web browser. The portal server can be associated with a Web portal that includes two or more portlets. Each portlet can be associated with a portlet specific enablement state. The enablement states for each of the portlets can be independent of enablement states of the other portlets. The Web browser can render the portal. When rendered, at least one portlet of the portal can be in an enabled state, while another portlet can be in a disabled state. Content can be displayed within the enabled portals only. The Web browser can include one or more user selectable controls for altering an enablement state of the rendered portlets.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
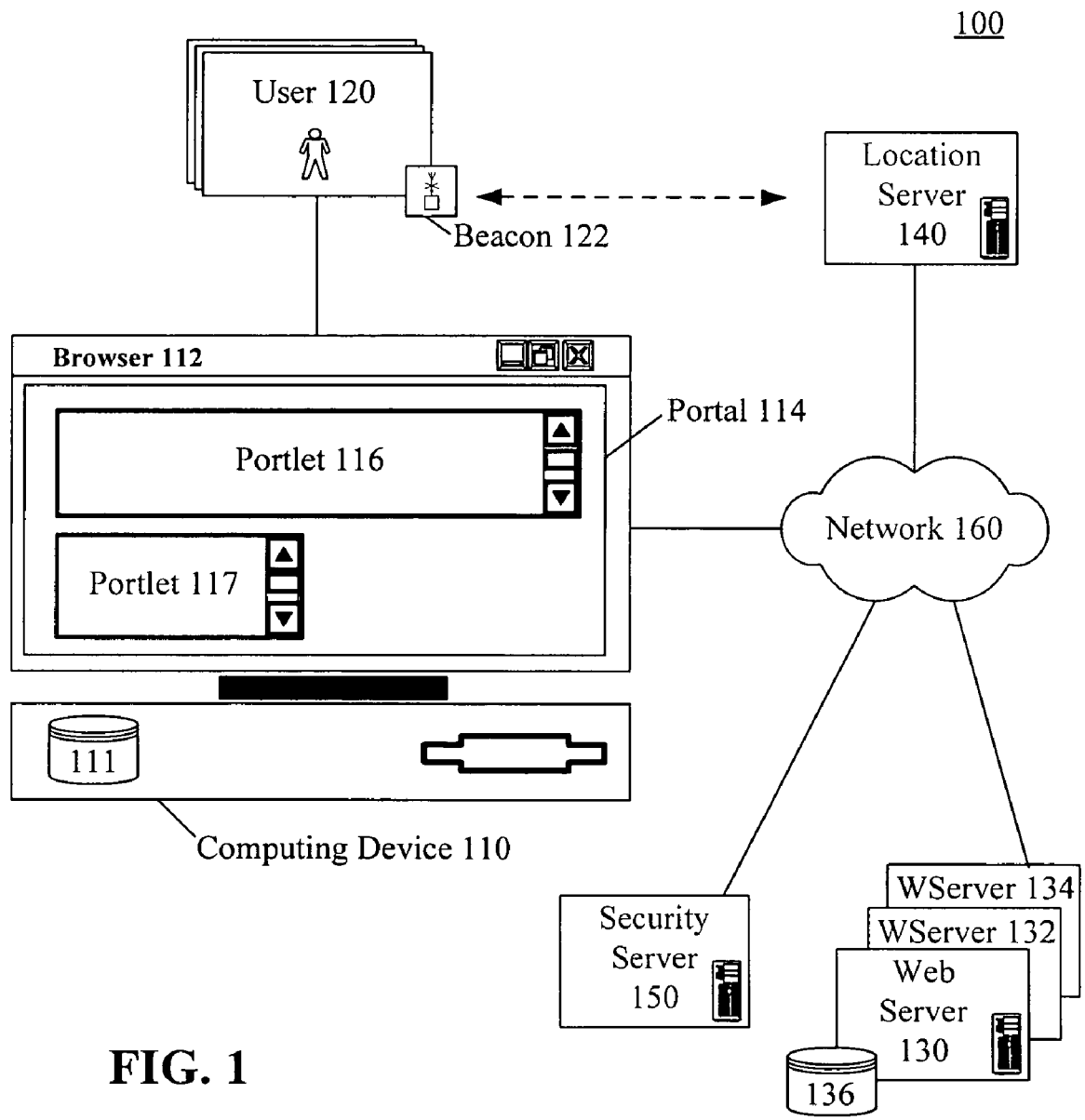
FIG. 1 is a schematic diagram of a system including a portal having portlets with portlet specific enablement states in accordance with an embodiment of the inventive arrangements disclosed herein.

FIG. 1 is a schematic diagram of a system 100 including a portal having portlets with portlet specific enablement states in accordance with an embodiment of the inventive arrangements disclosed herein. More specifically, system 100 can include a computing device 110 with an installed browser 112 within which a portal 114 is presented to user 120. The portal 114 can include portlets 116-117. Portal 114 can be associated with Web server 130. Information within portlet 116 can be obtained from Web server 132. Information within portlet 117 can be obtained from Web server 134. A portion of the information presented within portal 114 and portlets 116-117 can be customized for user 120. Each Web server 130-134 can store user specific customization parameters in data store 136.

Each Web server 130-134 can include a computer program that serves pages and files to remote locations. Particular Web servers 130-134 can be associated with the portal 114 and the portlet 116-117.

Computing device 110 can include any computing device capable of presenting portal 114. Information can be exchanged between computing device 110 and Web servers 130-134 via network 160. Device 120 can include, but is not limited to, desktop computers, servers, mobile telephones, tablet computers, personal data assistants (PDAs), digital media players, and the like. Computing device 110 can store computer settings, parameters, cookies, Web pages, and the like in local data store 111.

Browser 112 can be an application that provides an ability to render pages provided by Web servers 130-134. Browser 112 can be a Web browser having a graphical user interface (GUI). Browser 112 can also be a multimodal browser or a voice browser, each having a speech modality for interacting with portal 114 and portlets 116-117.

Portal 114 can be a Web site or gateway that serves as starting points to other destinations or activities on the Web. Portal 114 can provide multiple services, which can include Web searching capability, news, free-email, discussion groups, online shopping, references and the like. Portals can include one or more portlets 116-117 that can link to remote Web pages, Web services, and/or other remotely provided content.

Although portlets 116-117 can be simultaneously displayed in portal 114, other arrangements are possible. For example, each portlet 116-117 can be associated with a page linked to a selectable tab, where the different pages (or portlets 116-117) are not simultaneously presented. That is, portlet 116 can be presented when one tab is selected and when a different tab is selected portlet 116 can be hidden and portlet 117 can be displayed.

Each portlet 116-117 can be a component that displays content to portal users obtained from a source external to the portal 114. Portlets 116-117 can be implemented as a relatively small chunk of secondary content, written in a markup language, a JAVA script, or other browser 112 renderable format. In one embodiment, each of the portlets 116-117 can represent a pagelet. Portlet specifications, such as a Web Services for Remote Portlets (WSRP) based specification, can define a set of standardized interfaces for portal 114 to portlet 116-117 communications.

Each portlet 116-117 can have an associated portlet enablement state and an associated portlet security level. A portlet security level can indicate a sensitivity of data associated with a given portlet. Portlet security levels can include, for example, unclassified, secret, top secret, confidential, public, and the like.

Portlet enablement states can include enabled, disabled, and access restricted states. Information is fully accessible from a portlet 116-117, when a portlet 116-117 is in an enabled state. Similarly, information is fully non-accessible, when a portlet 116-117 is in a disabled state. Disabled states can include states where content from a Web server 130-134 is blocked so that the associated portlet 116-117 fails to receive content and states where content is conveyed to computing device 110, but where user 120 is prevented from accessing the content. For example, a visual overlay, such as a screen saver, can be used to obstruct a presentation of conveyed information. Generally, user 120 will have to re-login or provide authentication information before a disabled portlet 116-117 is re-enabled.

Access restricted states can include states where information is visibly hidden or at least partially obscured. A user may not be required to re-login to enable a portlet in a restricted state. For example, a portlet specific screen saver can hide portlet data until a pointer is placed over the portlet 116-117 to re-enable it. Another access restricted state can disable a visual modality, while enable a speech modality. That is, a user can hear information speech-presented from the portal, such as through headphones, but visual presentation options can be unavailable. When a speech mode is active, portlet content can be automatically transcoded or converted from a visual format (XML or HTLM) to a speech-enabled format (VoiceXML), as necessary.

Yet another access restricted state can impose a security level filter on portlet data. A filtered portlet can sanitize data so that only non-sensitive data (or data having a security level less than or equal to an enabled security filter) can be provided within the filtered portlet.

A security server 150 can be responsible for user authentication, authorization, and access control. The security server 150 can implement security restrictions on a portlet-by-portlet basis. In various embodiments, the security server 150 can utilize software security agents residing on the computing device 110, security programs residing on one or more Web servers 130-134, and/or security programs, such as Web services, that are executed in a computing space remote from computing device 110 and Web servers 130-134. The security server 150 and associated software agents can be responsible for detecting security events and for triggering actions appropriate for these detected events.

For example, the security server 150 can detect that the computing device 110 is moved from a secure area to an unsecured area. In response, portlet specific security precautions can be implemented for the selective ones of the portlets 116-117. For instance, if portlet 116 contains highly sensitive information and if user 120 is not located proximate to the computing device 110 (as determined by location server 140), then portlet 116 can be immediately disabled. Portlet 117, which can contain only non-sensitive information, can remain in an enabled state.

Location server 140 can automatically and dynamically determine a location for user 120 and for computing device 10 based upon one or more location beacons 122. In one embodiment, location server 140 can include geographical regions and location information that can be combined with beacon 122 provided information to map users 120 and/or devices 110 within defined rooms of a region. For example, the location server 140 can utilize beacon and mapping data to determine whether computing device 110 is in a secured or unsecured room.

Beacon 122 can include passive and active mechanisms used to ascertain locations and/or information about an associated device 110 or user 120. One or more location sensors can be used in conjunction with the beacon 122. Scanned information from the location scanners can be used cooperatively, such as with a triangulation technique, to accurately determine a location of a beacon 122. The beacon 122 can be implemented as a RFID tag, a GPS transceiver, a BLUETOOTH transceiver, and other such devices.

Network 160 can communicatively link computing device 110, location server 140, security server 150, and web servers 130-134 to each other. Network 160 can include any hardware /software/ and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can further include circuit-based communication components and mobile communication components, such as telephony switches, modems, cellular communication towers, and the like. Network 160 can include line based and/or wireless communication pathways.

Data stores 111 and 136 can each be a physical or virtual storage space configured to store digital information. Data stores 111 and 136 can be physically implemented within any type of hardware including, but not limited to, a magnetic disk, an optical disk, a semiconductor memory, a digitally encoded plastic memory, a holographic memory, or any other recording medium. Each of data stores 111 and 136 can be a stand-alone storage unit as well as a storage unit formed from a plurality of physical devices. Additionally, information can be stored within data stores 111 or 136 in a variety of manners. For example, information can be stored within a database structure or can be stored within one or more files of a file storage system, where each file may or may not be indexed for information searching purposes. Further, data stores 111 and 136 can utilize one or more encryption mechanisms to protect stored information from unauthorized access.

To illustrate system 100 in use, user 120 can select portal 114 using browser 112 of computing device 110. Portal 114 can include multiple portlets, such as portlet 116 and portlet 117. Web server 130 can be associated with portal 114. The server 130 can maintain session information for each portlet 116-117 for the duration of a session. The user can initially convey authentication information to server 130 and can receive a cookie with a session ID activating the portal 114. The session ID can separately activate each individual portlet 116-117. The session ID for each portlet can indicate a portlet enablement state.

If a user wants to logout portlet 116, a logout command can be conveyed to server 130. Server 130 can responsively convey a new session ID that changes the activation state for portlet 116 so that user 120 cannot request/view information and conduct transactions with portlet 116. The user can still access portal 114 and portlet 117. If the user wants to restore access to portlet 116, an access restore command (and authorization information) can be conveyed to server 130, which can responsively issue a new session ID that re-enables portlet 116.

It should be understood that the above illustration of portal controlled access to portlets is just one contemplated arrangement for the invention detailed herein. In another embodiment, portlet security can be handled locally by computing device 100. Additionally, a remotely located Web service, can functional as a communication intermediary between computing device 110 and Web servers 130-134, where the Web service provides independent portlet enablement capabilities.

Figure 2:
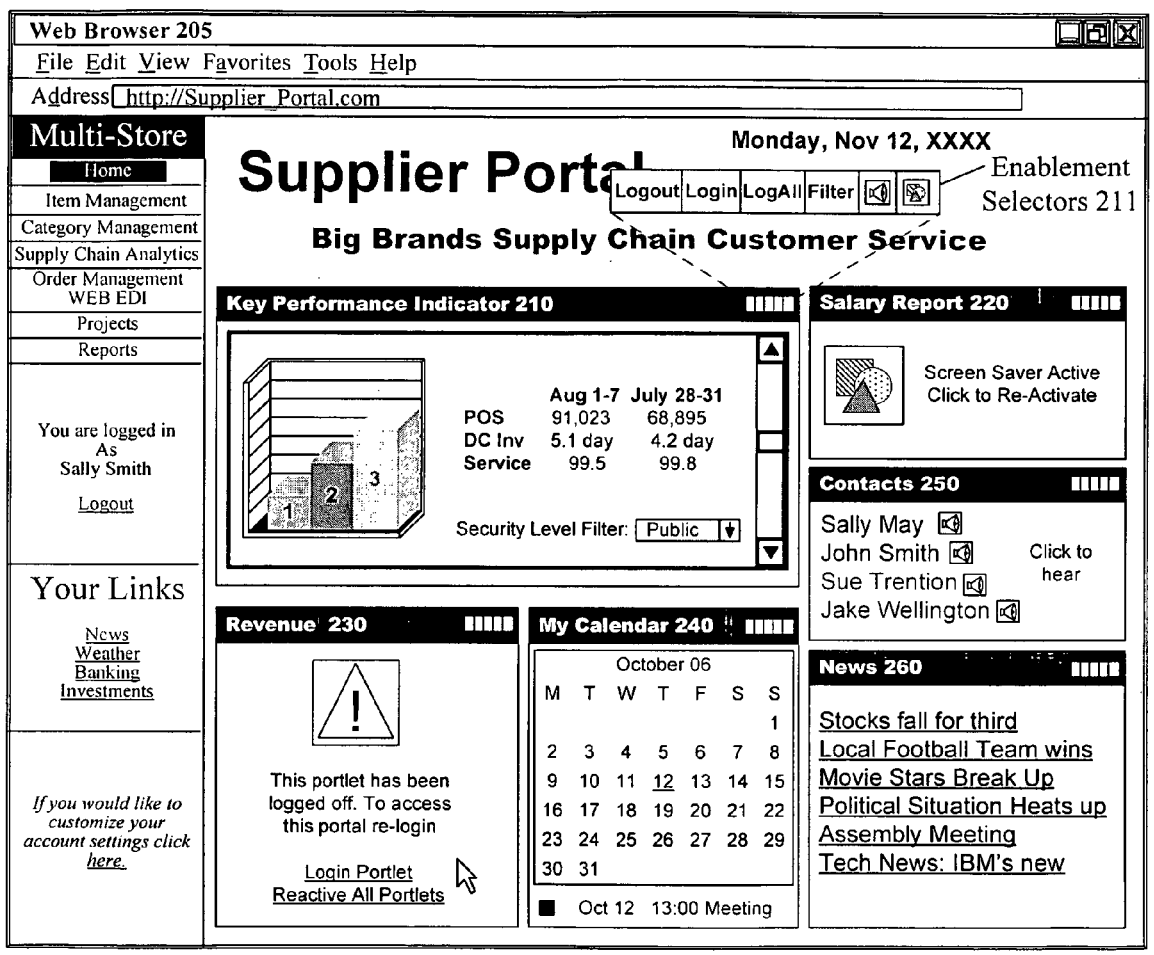
FIG. 2 illustrates one contemplated interface including a portal having one or more portlets with portlet specific enablement states in accordance with an embodiment of the inventive arrangements disclosed herein.

FIG. 2 illustrates one contemplated interface 200 including a portal having one or more portlets with portlet specific enablement states in accordance with an embodiment of the inventive arrangements disclosed herein. Interface 200 can be one potential interface for portal 114 of system 100. It should be appreciated, however, that interface 200 is provided for illustrative purposes only and that other derivative and alternative interfaces are to be considered within the scope of the present invention.

Interface 200 is a graphical user interface (GUI) of a supplier portal having portlets 210, 220, 230, 240, 250, and 260. The different ones of the portlets 210, 220, 230, 240, 250, and 260 can include information having different sensitivity levels. Each of the portlets 210, 220, 230, 240, 250, and 260 can have different portlet enablement modes. The different enablement states can correspond to different sensitivity or security levels to permit a user to access portal information without a significant risk of inadvertent disclosure of sensitive information. Enablement states for portlets can include enabled, disabled, and access restricted states.

In interface 200, portlets 240 and 260 can be enabled portlets providing publicly available or low sensitivity level information. Portlet 260 can include a series of news articles tailored for the interests of a user.

Portlet 240 can include calendar information. The basic calendar portlet 240 may not display sensitive information. Selections can be made from within portal 240, however, can cause sensitive information to be presented, such as a detailed schedule for an individual that wishes his/her whereabouts to remain confidential. Accordingly, selections made within portlet 240 can alter a sensitivity level of the portlet 240 and may require user authorization before more sensitive information is presented. This safeguard can prevent an unauthorized individual from inadvertently accessing/viewing sensitive data.

One method of preventing an inadvertent disclosure is shown by portlet 250. Portlet 250 presents basic contact information, such as a contact name, but does not visually display contact specific information. Instead, a user can hear the information (through a speech modality) by clicking on an associated audio icon. For example, a cell phone number of Sally May can be audibly presented to a user (possibly using headphones) by clicking on the audio icon next to Sally May. Portlet 250 represents an access restricted portlet.

Another access restricted portlet is portlet 220 for a salary report. Visual information of portlet 220 is visibly obscured by a visual overlay (screen saver). Clicking within the portlet 220 automatically removes the obstructing overlay and shows the portal specific information. The overlay can prevent bystanders from glancing at salary information when a user is too preoccupied to notice the potential security risk.

In one embodiment, a time-out counter can be associated with one or more of the portlets, such as portlet 220. The graphically overlay can automatically appear upon an expiration of the time-out counter. A time-out counter can be visually displayed within the portlet 220 to warn a user that the portlet 220 is about to be hidden. In one embodiment, the warning can be provided as a pop-up window that is automatically presented once a time-out counter reaches a previously determined time.

In contrast to portlet 220, portlet 230 can represent a portlet in a disabled state. Portlet 230, which contains revenue information, can be blocked and can require a user to login before access to the portlet 230 is granted. A user can choose to re-login to portlet 230 only or can choose to reactive all disabled or access restricted portlets, depending on the user's desires. A time-out counter can also be associated with a disabled portal 230 that automatically disables a portal when the counter expires.

Yet another type of access restricted portlet is shown by portlet 210, which displays key performance indicators. Portlet 210 can include a security level filter, currently set for public. Additional information can be presented in portlet 210, whenever the security level filter changes. For example, individual employee performance indicators (considered confidential) can be displayed in portlet 210 when the security level filter is set for confidential or higher.

Each of the portlets 210-260 can include enablement selectors 211 that permit a user to control a state of an associated portlet. Enablement selectors 211 can include selectors to logout, to login, to login all currently disabled or restricted portlets, to impose or change a security filter, to enable an audio-only modality, or to trigger a visual overlay.

Figure 3:
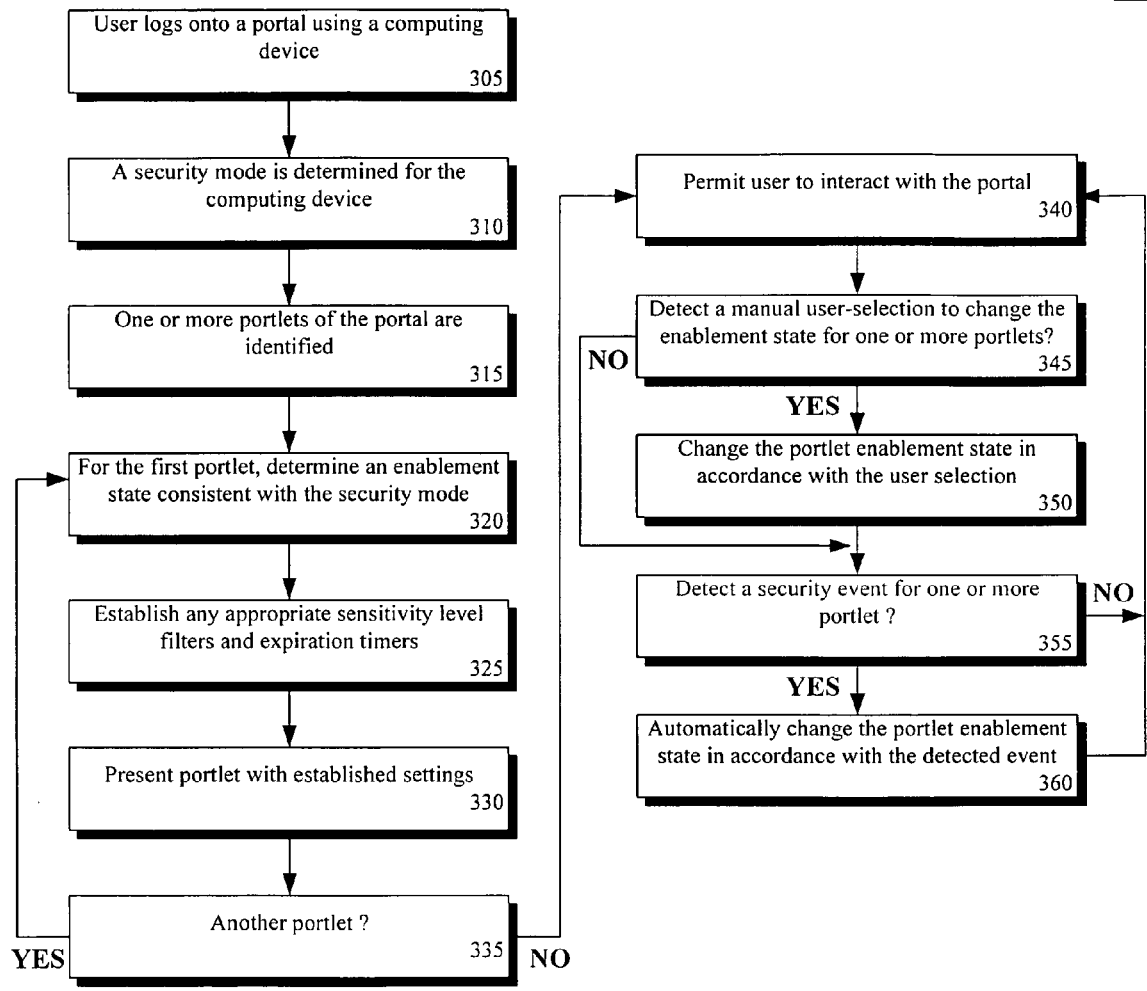
FIG. 3 is a flow chart of a method for implementing portlet specific enablement states in accordance with an embodiment of the inventive arrangements disclosed herein.

FIG. 3 is a flow chart of a method 300 for implementing portlet specific enablement states in accordance with an embodiment of the inventive arrangements disclosed herein. Method 300 can be performed in the context of a system 100 and/or in the context of an interface 200.

Method 300 can begin in step 305, when a user logs onto a portal using a computing device. In step 310, a security mode can be determined for the computing device. The security mode can be based upon numerous factors such as whether the computing device is in a secure location, whether the device itself is a secure device, whether a user is close to a device, and whether any "unsafe" users are proximate to the device. In one embodiment, these factors can be handled by a security server 150 that utilizes information provided by a location server 140.

In step 315, one or more of the portlets for the portal can be identified. In step 320, a security mode for the first identified portlet can be determined. The security mode of the portlet can be compared to the security mode determined for the device to ascertain a proper enablement state for the portlet.

For example, if the portlet has a security mode of "secret" and the computing device has a security mode of "top secret" then the portlet can be enabled. If the portlet has a security mode of secret and the computing device has a "public" security mode, then the portlet can be disabled by default or set to a restrictive access state.

In step 325, after a default enablement state has been established for the portlet, any suitable sensitivity level filters and expiration timers can be configured. For example, if a portlet containing sensitive information is presented on a publicly located device, the portlet can be initially enabled with a time-out counter of three minutes. Once the time-out counter expires, the portlet can be automatically disabled. Alternatively, a security level filter can be established so that only the sensitive information of the portal is sanitized so that only "public" information is displayed within the portal by default. Default enablement states can be determined by user configurable settings, portal server settings, and/or security server policies.

In step 330, the portlet can be presented to the user within the portal. A default enablement state setting can be established for the presented portlet. In step 335, a determination can be made as to whether the portal includes additional portlets. If so, the method can loop to step 320, where a default enablement state for the next portlet can be determined.

Otherwise if no additional portlets exist, the method can progress to step 340, there the user is permitted to interact with the portal. In step 345, a check for manually triggered changes can be performed. That is, the method can check to see if a user has selected to change an enablement state for any of the portlets. If a manual change is detected, the method can progress to step 350, where the portlet enablement state can be changed in accordance with the user selection.

Otherwise, the method can skip from step 345 to step 355, where a check for an automatically triggered change can be performed. An automatic change can be based upon a detected enablement event. An enablement event can be portlet independent, such as when a computing device moves from one security area to another. An enablement event can also be portlet specific, such as when an expiration timer associated with a particular portlet expires.

If the enablement event is detected in step 355, the method can progress to step 360, where the portlet enablement state can be automatically changed in accordance with the detected event. Otherwise, the method can progress from step 355 back to step 340, where the user can be permitted to interact with the portal.

Figure 4:
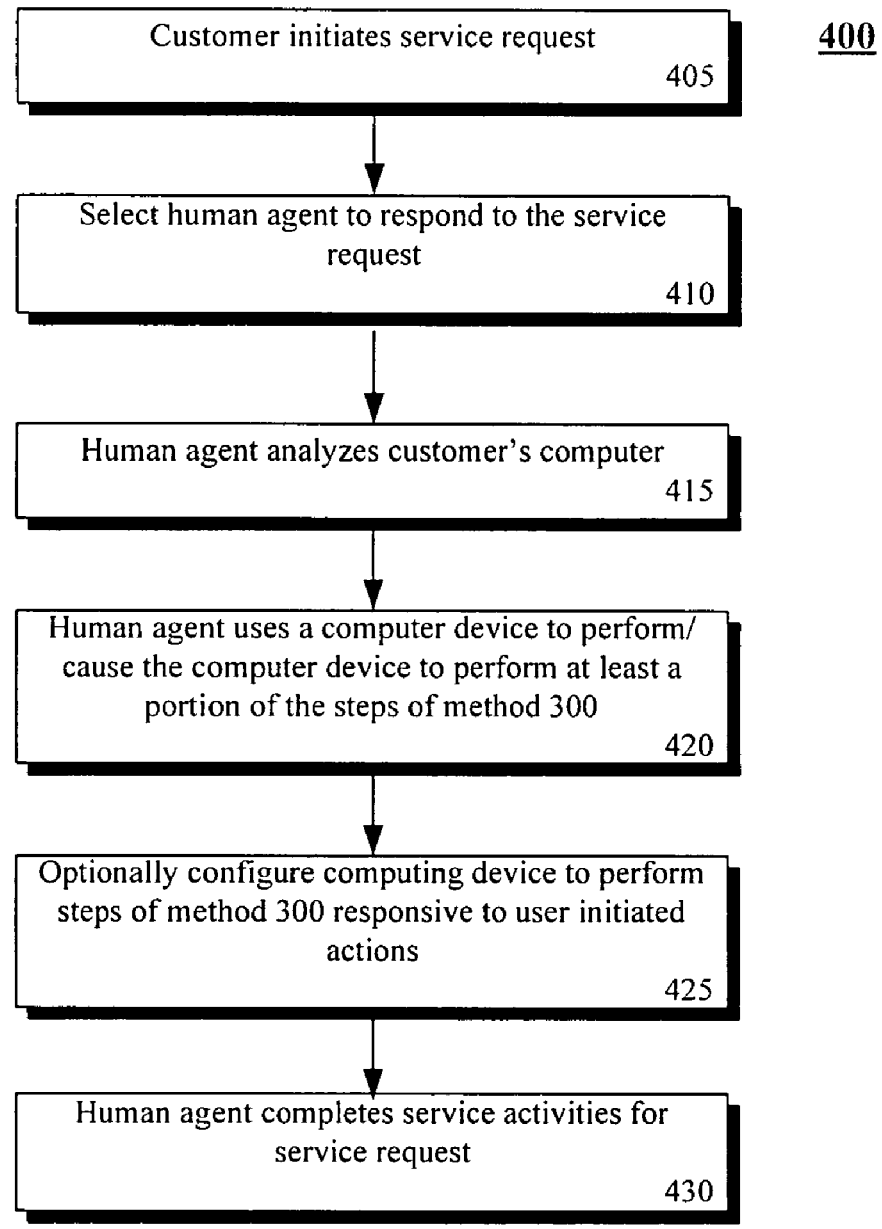
FIG. 4 is a flow chart of a method, where a service agent can configure a system that includes portlet specific enablement states in accordance with an embodiment of the inventive arrangements disclosed herein.

FIG. 4 is a flow chart of a method 400, where a service agent can configure a system that includes portlet specific enablement states in accordance with an embodiment of the inventive arrangements disclosed herein. Method 400 can be preformed in the context of system 100.

Method 400 can begin in step 405, when a customer initiates a service request. The service request can be a request for a service agent to convert an existing customer-owned portal into a portal having independent portlet enablement states. An associated portlet server can be owned by either the service agency or the customer. The service request can also be a request to troubleshoot a problem or to upgrade an existing system having portlet specific enablement states.

In step 410, a human agent can be selected to respond to the service request. In step 415, the human agent can analyze a customer's current system and can develop a solution. The solution can include the acquisition and deployment of additional hardware, such as a security server, location server, location beacons, and location sensors. The solution can also be a software only solution that changes code associated with a customer's Web portal.

In step 420, the human agent can use one or more computing devices to perform or to cause the computer device to perform the steps of method 300. In optional step 425, the human agent can configure the customer's computer in a manner that the customer or clients of the customer can perform one or more steps of method 300 in the future. For example, the service agent can load and configure a portal server so that Web clients accessing the server are provided with a portal having portlet specific enablement states. In step 430, the human agent can complete the service activities.

It should be noted that while the human agent may physically travel to a location local to adjust the customer's computer or application server, physical travel may be unnecessary. For example, the human agent can use a remote agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for selectively enabling portlets comprising:
providing a portal including a plurality of portlets, wherein each portlet has an associated portlet security level that indicates a maximum sensitivity level of information able to be presented in the portlet;
determining a portlet enablement event associated with a set of at least one of the plurality of portlets, wherein said set is less than a total number of portlets in the plurality of portlets, wherein said determined set corresponds to the portlet security levels of the portlets;
presenting the portal, including the plurality of portlets, wherein each portlet comprises portlet specific graphically rendered enablement selectors, wherein said enablement selectors comprise a logout selector, a login portlet selector, a login all currently disabled or restricted portlet selector;
responsive to the portlet enablement event, changing portlet enablement states of each portlet in the set without changing portlet enablement states of portlets in the plurality that are not part of the set, wherein at least one of the portlets of the portal includes customized data for a user, and wherein said enablement selections permit a user to dynamically adjust an enablement state of that portlet while interacting with the portal, said portlet enablement states comprising an enabled state, a disabled state, and an enabled in an access restricted state, and wherein the providing, determining, presenting, and changing of the method are performed by a processor of a machine responsive to executing computer-readable instructions of a computer program product that is digitally encoded in a tangible storage medium.

2. The method of claim 1, further comprising:
detecting a manually triggered change where a user has selected a change of an enablement state for the set of presented portlets associated with the portlet enablement event, wherein the changing step changes the portlet enablement state from an enabled state to a disabled state, wherein at least one of the plurality of portlets is in an enabled state, after said changing of the portlet enablement states, permitting the user to continue to interact with the portal comprising the plurality of portlets, at least a portion of which having enablement states changed during an interactive session with the user.

3. The method of claim 1, further comprising:
detecting a manually triggered change where a user has selected a change of an enablement state for the set of presented portlets associated with the portlet enablement event, wherein the changing step changes the portlet enablement state from a disabled or enabled state to a restricted access state, wherein at least one of the plurality of portlets is in an enabled state, after said changing of the portlet enablement states, permitting the user to continue to interact with the portal comprising the plurality of portlets, at least a portion of which having enablement states changed during an interactive session with the user.

4. The method of claim 1, wherein the portlet enablement event is a manually triggered event based upon a user selection.

5. The method of claim 1, wherein the portlet enablement event is an automatically triggered event, wherein said enablement event is based upon an automatically detected change of location of a location beacon, after said changing of the portlet enablement states, permitting the user to continue to interact with the portal comprising the plurality of portlets, at least a portion of which having enablement states changed during an interactive session with the user.

6. The method of claim 1, at least one of the set of portlets is visually provided with an enablement selector to allow a user to change an enablement state of the at least one of the set of portlets, and wherein each of the plurality of portlets are provided with their own enablement selectors.

7. The method of claim 1, wherein each of the plurality of portlets comprise a plurality of independent enablement states, which permit each portlet to selectively be enabled, disabled, or enabled in an access restricted fashion, wherein said enablement selector associated with each portlet permits a user to change an independent enablement state of that portlet.

8. The method of claim 7, further comprising:
receiving an enablement authorization for one portlet of the at least two portlets; and
responsive to the enablement authorization adjusting the enablement state of the one portlet to an enabled state, wherein an enablement state for each other portlet of the set remains unchanged.

9. The method of claim 1, further comprising:
receiving via a manually entered user input an enablement authorization for the set of portlets associated with the portlet enablement event; and responsive to the enablement authorization adjusting the enablement state of each portlet in the set to an enabled state, after said adjusting of the portlet enablement states, permitting a user to continue to interact with the portal comprising the plurality of portlets, at least a portion of which having enablement states changed during an interactive session with the user.

10. The method of claim 1, further comprising:
initially logging onto the portal, wherein the logging step includes providing user identification and authorization data;
authorizing access to the portal based upon the user identification and authorization data; and
responsive to the authorizing step, enabling each of the plurality of portlets.

11. The method of claim 1, wherein content of at least one of the portlets in the set is obscured by a visual overlay.

12. The method of claim 1, wherein a communication connection to a Web site associated with a disabled one of the portlets is severed while the portlet is in a disabled state, and wherein a communication connection to a different Web site associated with an enabled one of the portlets is simultaneously maintained, wherein the disabled communication with the portlet in the disabled state is able to be dynamically re-enabled during an interaction session of a user and the portal responsive to a manually entered user input.

13. The method of claim 1, wherein each portlet in the set includes confidential user information, and wherein the portlets of the plurality not included in the set lack confidential user information.

14. The method of claim 1, wherein said steps of claim 1 are performed by at least one machine in accordance with at least one computer program having a plurality of code sections that are executable by the at least one machine.

15. A software interface for a computing system resulting from a computer program product stored in a storage medium executing on hardware comprising:
a Web portal executed on a computing platform comprising hardware responsive to code stored in a physical storage medium of the computing platform and containing a plurality of portal segments, wherein each portal segment is associated with a segment specific enablement state, wherein enablement states for each of the portal segments include an enabled state, an access restricted state, and a disabled state, wherein said access restricted state comprises a state where a visual modality is disabled while a speech modality is enabled or a state where a security level filter having a plurality of configurable values is enabled such that data presented in that portal segment is sanitized to a security level no greater than a value of the security level filter, and wherein portal segments having a disabled state are presented as disabled portal segments, wherein each of the portal segments has portal segment specific enablement selectors, wherein said enablement selectors comprise a logout selector, a login selector, a login all currently disabled or restricted portal segment selector, wherein said enablement selectors further comprise a selector for a security filter, a selector for an audio-only modality, and a selector for a visual overlay.

16. The software interface of claim 15, further comprising:
a plurality of user selectable controls for manually changing the enablement state of each of the portal segments, a selection of any of said controls dynamically changes the enablement state for the associated portal segments while permitting interactions with the portal to continue.

17. A system for displaying Web content comprising:
a portal server executed on a hardware computing platform based on code stored in a storage medium of the hardware computing platform and associated with a
Web portal comprising a plurality of portlets, wherein each of the portlets is associated with a portlet specific enablement state, wherein the enablement states for each of the portlets are independent of enablement states of the other portlets, said portlet enablement states comprising an enabled state, a disabled state, and an enabled in an access restricted state, and wherein said portal server is configured to trigger a change in an enablement state of specific ones of the portlets without manual user input based upon a detected enablement event, said detected enablement event comprising at least one of:
an event determined by a change in geographic position of a computing device presenting said Web portal; and
an event determined by an expiration of a portlet specific expiration timer;
a Web browser, executed on said computing device and based on code stored on a storage medium of the computing device, the computing device in communication with the portal server and configured to render the portal and the included portlets, wherein at least one rendered portlet is in an enabled state, wherein at least one rendered portlet is in a disabled state, wherein content is displayed within rendered portlets having an enabled state, wherein portlets having a disabled state are displayed as disabled portlets, and
wherein the Web browser includes a set of user selectable controls for altering an enablement state of the rendered portlets, said set of user selectable controls comprising a logout selector, a login portlet selector, a login all currently disabled or restricted portlet selector, wherein said user selectable controls further comprise a selector for a security filter, a selector for an audio-only modality, and a selector for a visual overlay.

* * * * *